Patented Oct. 6, 1936

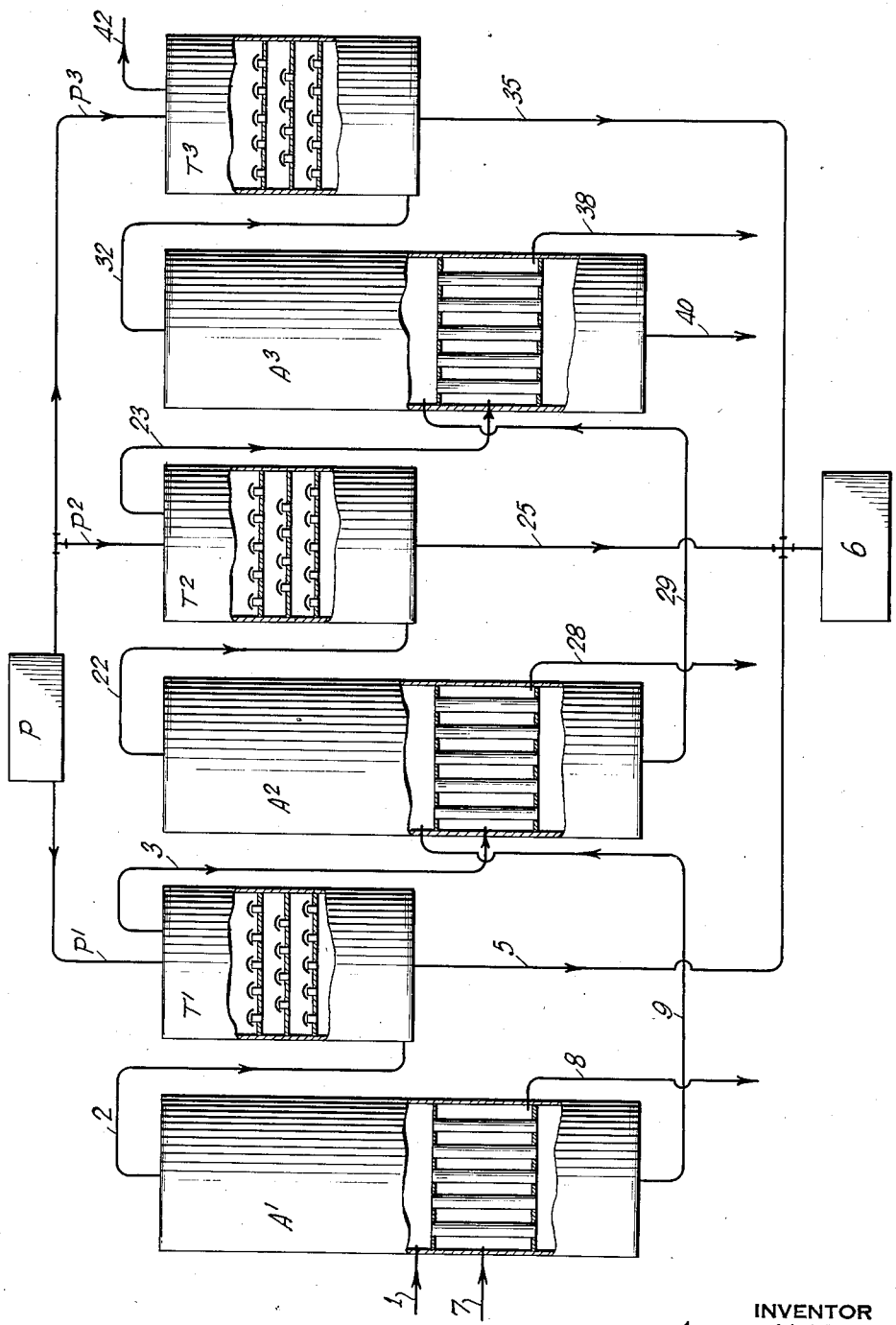

2,056,748

UNITED STATES PATENT OFFICE 2,056,748

PROCESS FOR PHENOL RECOVERY

Alvin Mitton Taylor, Montclair, N. J.

Application February 9, 1935, Serial No. 5,840

12 Claims. (Cl. 260—154)

The invention relates to a process for recovering phenol from liquors in which it occurs as a constituent. More particularly, it relates to recovering phenol from aqueous solutions, especially that known as "still waste" solution arising in conjunction with the distillation of coal with the formation of coke, and includes correlated improvements and discoveries whereby the recovery of phenol from such liquors is enhanced.

The effluent from the ammonia stills utilized in reclaiming the ammonia from the liquors formed in the hydraulic main, that is, the so called gas liquor produced in by-product coke oven operation, forms a material giving difficulty in its disposal because of the content therein of phenol. As a consequence thereof it cannot be discharged into rivers or streams which are utilized as supplies for potable water, and hence its disposal is at the present time largely effected by its utilization as the medium for quenching or cooling the hot coke. However, such use is attended by certain disadvantages in that disagreeable, obnoxious odors arise and very marked deterioration ensues inasmuch as the evolved steam carries with it the phenol vapors and others arising from decomposition of various salts. Furthermore, the "still waste" presents a real problem from the standpoint of disposal, for even if the phenol were completely removed it would still contain undesirable salts, as calcium chloride, sulfate, sulfide, thiocyanate, cyanide, etc., which it would be inadvisable to introduce into sources of potable water supplies.

Many suggestions have been made and procedures worked out for the elimination of phenol. Certain of these entail contacting the "still waste" with a solvent, whereas others remove the larger portion of the phenol by passing steam or an inert gas therethrough. The phenol thus obtained by condensation is wasted by using the condensate to cool coke, or it may be absorbed in caustic soda from which the phenol may be obtained by acidification. These various procedures, however, fail to effect a complete removal of the phenol, and there remains as a rule more than 100 parts per million. Inasmuch as various water control boards will not permit more than one part per million in potable supplies, the so called purified solution is wholly unfit for use or even for introduction into streams constituting sources of potable water supplies unless the volume of flow is sufficient to bring about a dilution to not more than one part per million.

It is an object of the invention to provide a procedure for recovering phenol from liquors in accordance with which the phenol is relatively completely removed and by means of which disadvantages present in previous procedures are obviated.

A further object of the invention is to provide a phenol recovery procedure by means of which phenol is readily separated from the containing liquor and by a means which permits its ready obtainment as such.

Another object of the invention is to recover phenol from liquors by a process which effectually combines an evaporation phase with subsequent removal from vapors thus produced through the medium of a suitable absorbent.

A still further object of the invention is to provide a process whereby phenol may be recovered from liquors without the necessity of first removing the ammonium salt content and, further, in which the salt content may be obtained in a marketable form.

A more specific object of the invention is to recover phenol from liquors by subjecting said liquors to evaporation in a multiple effect system with absorption of the phenol from the arising vapors by contacting with a solvent for the phenol, and with removal of phenol from the solvent medium and obtention of the salt content by means of a final drying step, all in a manner which may be carried out readily, effectively, and economically on a commercial scale.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the invention will be indicated in the claims.

In the practice of the invention phenol may be separated or recovered from a liquor in which it is contained as a "still waste" solution by subjecting the liquor to evaporation by indirect heat exchange until substantially total vaporization of the phenol is effected and recovering phenol from the vapors thus produced, as by contacting with a suitable absorbent for the phenol. The evaporation of the liquor causes phenol to pass off in vapor form along with the other vapors arising from the liquor. These vapors are then contacted with an absorbent which may be either solid or liquid, and the phenol taken up may be obtained from the absorbent by distillation with recovery of the absorbent if it is a solvent liquid, or by chemical treatment, or by a combination of such procedures.

Evaporation of the liquor may be advantageously carried out in a multiple effect system. Preferably the system will be operated under reduced pressure. Thus the vapors arising in a first effect will be contacted with a phenol solvent and then conducted into the heating chamber of a second effect, thus supplying heat whereby the liquor in such effect is evaporated. In like manner the vapors from the second effect are contacted with a solvent and serve as a heating medium for the liquor in a third effect. The number of effects utilized may be that determined to be necessary in view of the efficiency desired.

The vapors arising from the evaporation of the liquor and containing phenol may be contacted with the solvent means in accordance with the countercurrent principle and in a tower. The tower may be of various types, as one packed with raschig rings, or other inert material giving an extended surface and over which the solvent trickles, or a plate tower through which the solvent flows in a downward direction while the vapors containing phenol pass upwardly through the solvent and perforations in the plates, or the tower may be of the bubble cap type used in the fractionation of liquids. In fact, any means whereby intimate contact of the phenol containing vapors may be brought about with the absorbent or solvent will suffice for removal of the phenol.

However, it will be understood that the efficiency of removal will depend upon the extent of such contact, and hence the more effectively it is brought about the greater will be the amount of phenol removed. The absorbent used may be an activated carbon, or a solvent, as tricresyl phosphate, higher alcohols, xylene, pyridine, chlor derivatives of diphenyl, a solution of sodium hydroxide, and the like. When the solvent used is of the nature of tricresyl phosphate, the phenol dissolved may be obtained by subjecting the solution to distillation, thereby securing the phenol as such, and the solvent in a condition that it may be returned to the recovery operation. When sodium hydroxide has been utilized to take up the phenol, sodium phenolate is formed. The phenol is obtained therefrom by acidification, for example, by means of carbon dioxide or sulfuric acid, and the sodium salt obtained may be recausticized and again serve as the means of selectively removing the phenol from the vapors arising from evaporation.

For a fuller understanding of the nature and objects of the invention, reference should be had to the following detailed description taken in connection with the accompanying drawing, in which there is diagrammatically shown an apparatus arrangement in which phenol may be recovered from liquors by evaporation and subsequent selective absorption of the phenol from the arising vapors. The apparatus shown includes a multiple effect system consisting of three effects or evaporating units $A_1$, $A_2$, $A_3$, and in connection with each effect there is an absorption unit or tower $T_1$, $T_2$, $T_3$, such towers being provided with a solvent supply system comprising a reservoir P and conduits $P_1$, $P_2$ and $P_3$. The various effects and absorption towers may be operatively connected for the passage of vapors and solvent to and from by means of suitable and properly positioned conduits.

The separation of phenol from a liquor may be considered illustratively relative to the obtention from a "still waste" solution.

It will be realized that such solution has been previously treated to remove therefrom the free and/or fixed ammonia content. This solution may be introduced into the first effect $A_1$ by means of a conduit 1 which conducts the solution into the evaporating space within the effect and wherein it is evaporated by means of steam introduced into the tube space by a pipe 7. The vapors arising pass from the top of the effect and are conducted through a conduit 2 to the base of the tower $T_1$, which preferably is of the bubble cap type. Solvent, as tricresyl phosphate, may be introduced into the top of this tower through conduit $P_1$, and passing down therethrough contacts with the vapors and removes phenol therefrom. The solvent is withdrawn through conduit 5 and passes to the receiver 6. The vapors which have been dephenolized pass through the conduit 3 to the second effect $A_2$ and serve therein as the heating medium. The solution which has been subjected to evaporation in $A_1$ passes through the conduit 9 into the second effect and is therein further evaporated.

The vapors passing from the second effect through the conduit 22 are led into the base of tower $T_2$ and therein are contacted with solvent in the same manner as described with respect to tower $T_1$. Likewise vapors from tower $T_2$ are conducted through conduit 23 to the third effect $A_3$, and serve to heat the solution that passes from the second effect through the conduit 29 to the third effect, whereby it is further evaporated and the vapors contacted with the solvent in tower $T_3$ by conducting them through the conduit 32.

The various condensates formed from the steam and dephenolized vapors as heating media are removed from the respective effects by the conduits 8, 28 and 38, and may be combined and passed into a stream, or other means of disposal without any danger of contamination. The liquor remaining in the third or last effect is a heavy liquor relatively free from phenol, but contains tar acids and salts present in "still waste" solutions, as calcium chloride, calcium sulfate, sulphocyanide, etc. Disposal of this liquor may be by first treating with an acid to cause separation of the tar acids and, after filtering whereby they are removed, the salts content may be separated by crystallization. Otherwise the liquor or the solution, after removal of tar acids, may be introduced into a dryer, preferably a spray dryer, wherein any phenol remaining will be driven off and the salts obtained in a dry, useable and salable condition. The absorbent or solvent containing phenol coming from the various towers, and conducted to a receiver 6 by conduits 5, 25 and 35, may be suitably treated to separate the phenol therefrom, preferably by distillation when tricresyl phosphate, higher alcohols, xylene and the like are used as solvent, or by treatment with acid when a solution of sodium hydroxide acts as the solvent, and hence which contains the phenol as sodium phenolate.

In accordance with the foregoing procedure the phenol content of a liquor as a "still waste" solution may be reduced by evaporation and contact of the vapors with a solvent, so that effluent liquid does not contain more than one part per million parts of water. The procedure also occasions the reclaiming or separation in useable and marketable form of the soluble salt content.

The liquor undergoing treatment may be that known as "still waste", or it may be a liquor following treatment whereby the free ammonia has been eliminated, and hence containing the fixed ammonia combined as chloride, sulfate, etc. When utilizing such an effluent the phenol is separated as such and the final drying of the liquor passing from the last stage or effect results in the production of an ammonium salt mixture which may be utilized without further treatment or purification in the manufacture of fertilizers, or for other purposes for which ammonium salts are adapted.

In all instances, regardless of the phenol containing liquor undergoing treatment, it has been found that by evaporation, desirably in a multiple effect system and under reduced pressure, the phenol content may be recovered in a merchantable condition by contacting the arising vapors with a suitable solvent without the solvent being contaminated or vitiated by means of tar acids and phenol-like bodies. The vitiation of a solvent has been a particular disadvantage in all attempts heretofore made to extract phenol from a solution by shaking or mixing it with a given solvent, but by causing the phenol in vapor form to pass from an evaporator along with water vapors and selectively absorbing the phenol from such vapors, there is made possible the recovery of the phenol from waste liquors in a manner which is economical and effective, and in addition it obviates a source of annoyance due to inability readily to dispose of the liquors. Also, the salt content may be recovered in a dry condition and may be used as such, or following separation into the various salts by fractional crystallization. These recovered salts of course assist in making the process commercially feasible.

The solvent used selectively to remove the phenol from accompanying water vapors is desirably one which is immiscible with water and which has a vapor pressure lower than that of water. Further, the solvent is maintained at that temperature which represents the dew point of the vapor or above. Any phenol remaining in the liquor withdrawn from the last stage or effect and which would be driven off when the liquor is subjected to final drying procedure may be re-claimed by passing the gaseous mixture throughout a solvent, or since the content is very low it may be allowed to waste without causing either annoyance or damage.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention hereinedescribed, and all statements of the scope of the invention which, as a matter of language, might be said to fall therebetween.

Having described my invention, what I claim as new and desire to secure by Letters Patent is:

1. A process for recovering phenol from liquors which comprises subjecting a liquor containing phenol to evaporation by indirect heat exchange until substantially total vaporization of the phenol is effected, and recovering phenol from vapors so produced.

2. A process for recovering phenol from liquors which comprises subjecting a liquor containing phenol to evaporation by indirect heat exchange until substantially total vaporization of the phenol is effected in a multiple effect system, and recovering phenol from the vapors produced in each effect.

3. A process for recovering phenol from liquors which comprises subjecting a liquor containing phenol to evaporation by indirect heat exchange until substantially total vaporization of the phenol is effected, and contacting vapors thus produced with an absorbent for phenol.

4. A process for recovering phenol from liquors which comprises subjecting a liquor containing phenol to evaporation by indirect heat exchange until substantially total vaporization of the phenol is effected, and contacting vapors thus produced with a solvent for phenol.

5. A process for recovering phenol from liquors which comprises subjecting a liquor containing phenol to evaporation by indirect heat exchange until substantially total vaporization of the phenol is effected in a multiple effect system, and contacting vapors produced in each effect with a solvent for phenol prior to introduction into a succeeding effect.

6. A process for recovering phenol from liquors which comprises subjecting a liquor containing phenol to evaporation by indirect heat exchange until substantially total vaporization of the phenol is effected in a multiple effect system under reduced pressure and contacting vapors produced in each effect with a solvent for phenol prior to introduction into a succeeding effect.

7. A process for recovering phenol from liquors which comprises subjecting a liquor containing phenol to evaporation by indirect heat exchange until substantially total vaporization of the phenol is effected, contacting vapors thus produced with a solvent for phenol, and recovering the phenol from said solvent by distillation.

8. A process for recovering phenol from liquors which comprises subjecting a liquor containing phenol to evaporation by indirect heat exchange until substantially total vaporization of the phenol is effected in a multiple effect system, contacting vapors produced in each effect with tricresyl phosphate prior to introduction into a succeeding effect, and recovering the phenol from the tricresyl phosphate by distillation.

9. A process for recovering phenol from liquors which comprises subjecting a liquor containing phenol to evaporation by indirect heat exchange until substantially total vaporization of the phenol is effected, contacting vapors thus produced with activated carbon, and subsequently recovering the phenol from said carbon.

10. A process for recovering phenol from liquors which comprises subjecting a liquor containing phenol to evaporation by indirect heat exchange until substantially total vaporization of the phenol is effected, and contacting vapors thus produced with a solution containing sodium hydroxide.

11. A process for recovering phenol from liquors which comprises subjecting a liquor containing phenol to evaporation by indirect heat exchange until substantially total vaporization of the phenol is effected in a multiple effect system, contacting vapors produced in each effect with a solution containing sodium hydroxide prior to introduction into a succeeding effect, and subsequently liberating the phenol by treatment with an acid.

12. A process for recovering phenol from liquors which comprises subjecting a liquor containing phenol to evaporation by indirect heat exchange until substantially total vaporization of the phenol is effected, continuing the evaporation until a heavy liquor containing salts present in the original liquor is obtained, and drying the heavy liquor obtained by such evaporation whereby the phenol content is fully removed and the salt content procured in a dry marketable form.

ALVIN MITTON TAYLOR.